United States Patent [19]

Lew et al.

[11] Patent Number: 4,494,192
[45] Date of Patent: Jan. 15, 1985

[54] HIGH SPEED BUS ARCHITECTURE

[75] Inventors: Eugene K. Lew, Sunnyvale; Harvey W. Wallace, San Jose, both of Calif.

[73] Assignee: Sperry Corporation, New York, N.Y.

[21] Appl. No.: 400,493

[22] Filed: Jul. 21, 1982

[51] Int. Cl.³ .............................................. G06F 1/00
[52] U.S. Cl. ................................................ 364/200
[58] Field of Search ... 364/200 MS File, 900 MS File

[56] References Cited

U.S. PATENT DOCUMENTS 3,820,079  6/1974  Bergh et al. .......................... 364/200

Primary Examiner—Raulfe B. Zache
Attorney, Agent, or Firm—John B. Sowell; Thomas J. Scott; Marshall M. Truex

[57] ABSTRACT

There is shown and described a high speed bus architecture which uses a common control bus and permits high speed data transfer between a plurality of active and/or passive users while reducing the system overhead structure which was previously required.

19 Claims, 6 Drawing Figures

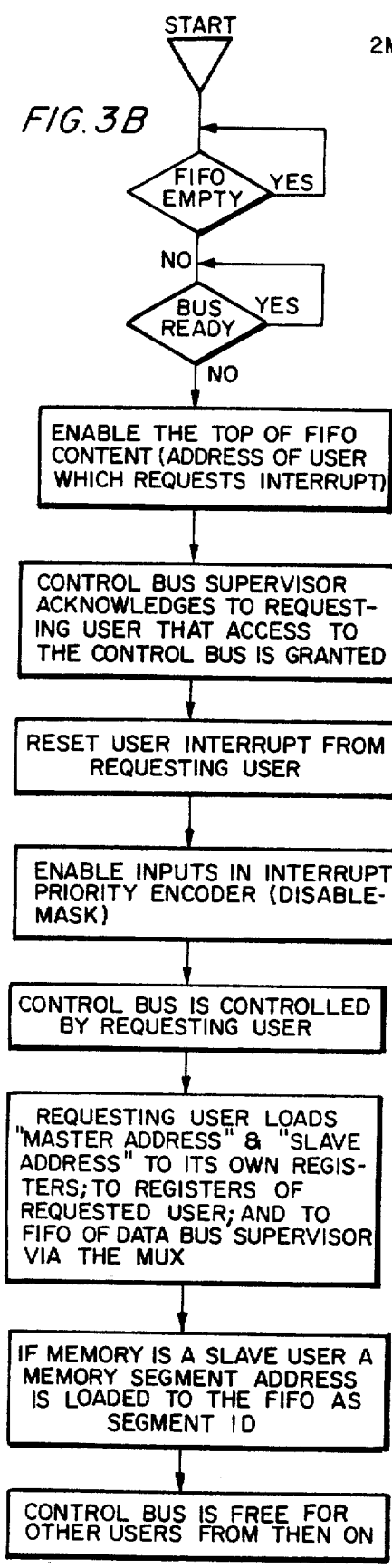
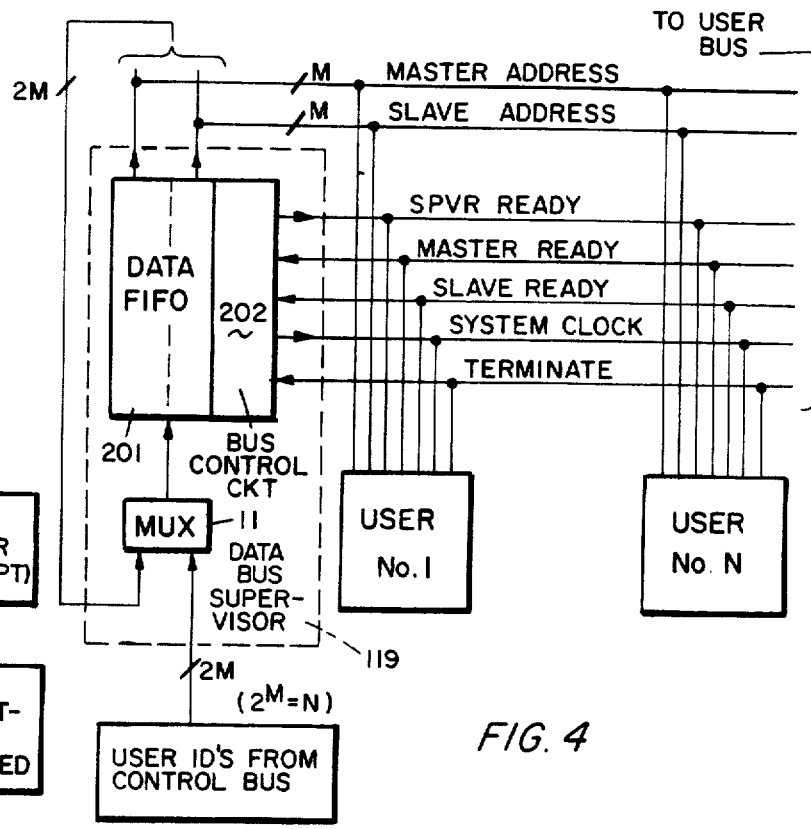
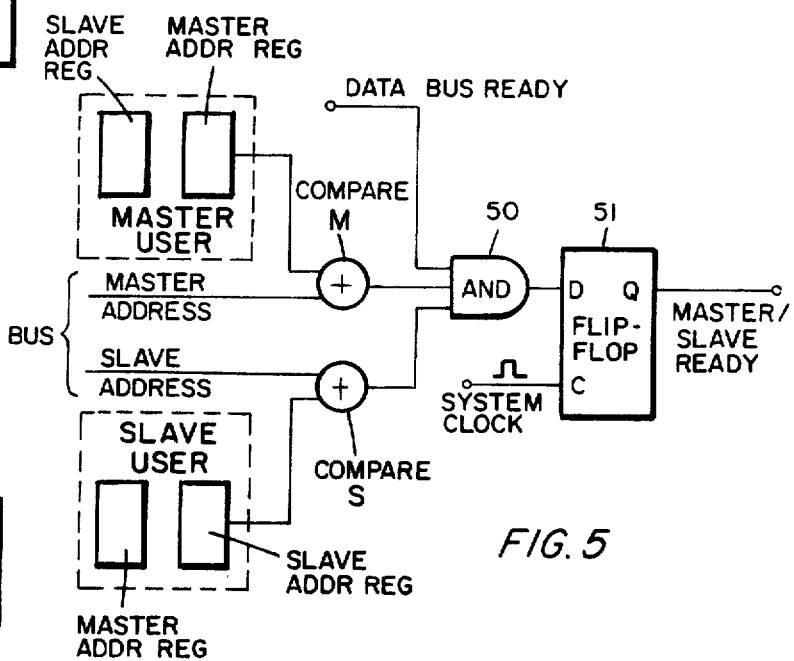

HIGH SPEED BUS ARCHITECTURE

BACKGROUND

1. Field of the Invention

This invention is directed to the architecture of a data bus, in general, and to a high speed data bus which is shared by a plurality of users, in particular.

2. Prior Art

In order to maximize the utilization of computer systems, it is frequently desirable to interface with and between a plurality of user systems. These users can be in the form of active users, i.e., those which initiate commands, or passive users, i.e., those which operate in response to commands. Of course, some of the users can operate in either of the modes when properly addressed. However, in the past it has been frequently required that the active user make a request to the system, i.e., through a control bus, the passive user, the CPU or the like, in order to initiate any operation or function. However, if one or more of the other units involved were "busy", the initiating active unit would be required to (a) re-address the system while waiting for access thereto or (b) proceed with another activity while keeping track of the activity which had been truncated because of the "busy" condition.

In the past, this has caused significant delays in the system operation. Inasmuch as the system is generally only as effective as its slowest operation or unit, the throughputs of prior systems were somewhat reduced. Moreover, the complexity of existing systems is increased because of the greater overhead requirements or the increased bookkeeping requirements which are involved in system operation.

In addition, in most of the known systems, the data which is to be transferred is handled by the same bus which includes command signals. Consequently, the command signals and the data signals are interleaved or intertwined. With this commingling of signals, the data transfer operation is negatively impacted. As well, the command operation can be seriously delayed when a significant block of data is being transferred along the common bus.

SUMMARY OF THE INVENTION

This invention is directed to an architectural system wherein the data bus and the control bus are separate devices. The bus architecture and communication protocol permit data transmission between a sender and a receiver at a data rate which is limited primarily by the circuit technology employed. The peak transfer rate is dependent upon the operation of the respective users. The architecture uses a multi-user interrupt priority arbitrator which arbitrates priority amongst concurrent requests from multiple users. The arbitrator also assures that all users get access to the bus. A data bus supervisor is also used to assure that the time overhead for requester user scanning is reduced or eliminated.

BRIEF DESCRIPTION OF THE DRAWINGS

FIGS. 3A and 3B are flow charts illustrating the operation of the system of the invention.

FIG. 4 is a more detailed block diagram of the data bus controller portion of the system shown in FIG. 1.

FIG. 5 is a schematic representation of the master/slave buffer registers in the user devices.

DESCRIPTION OF A PREFERRED EMBODIMENT

Figure 1:
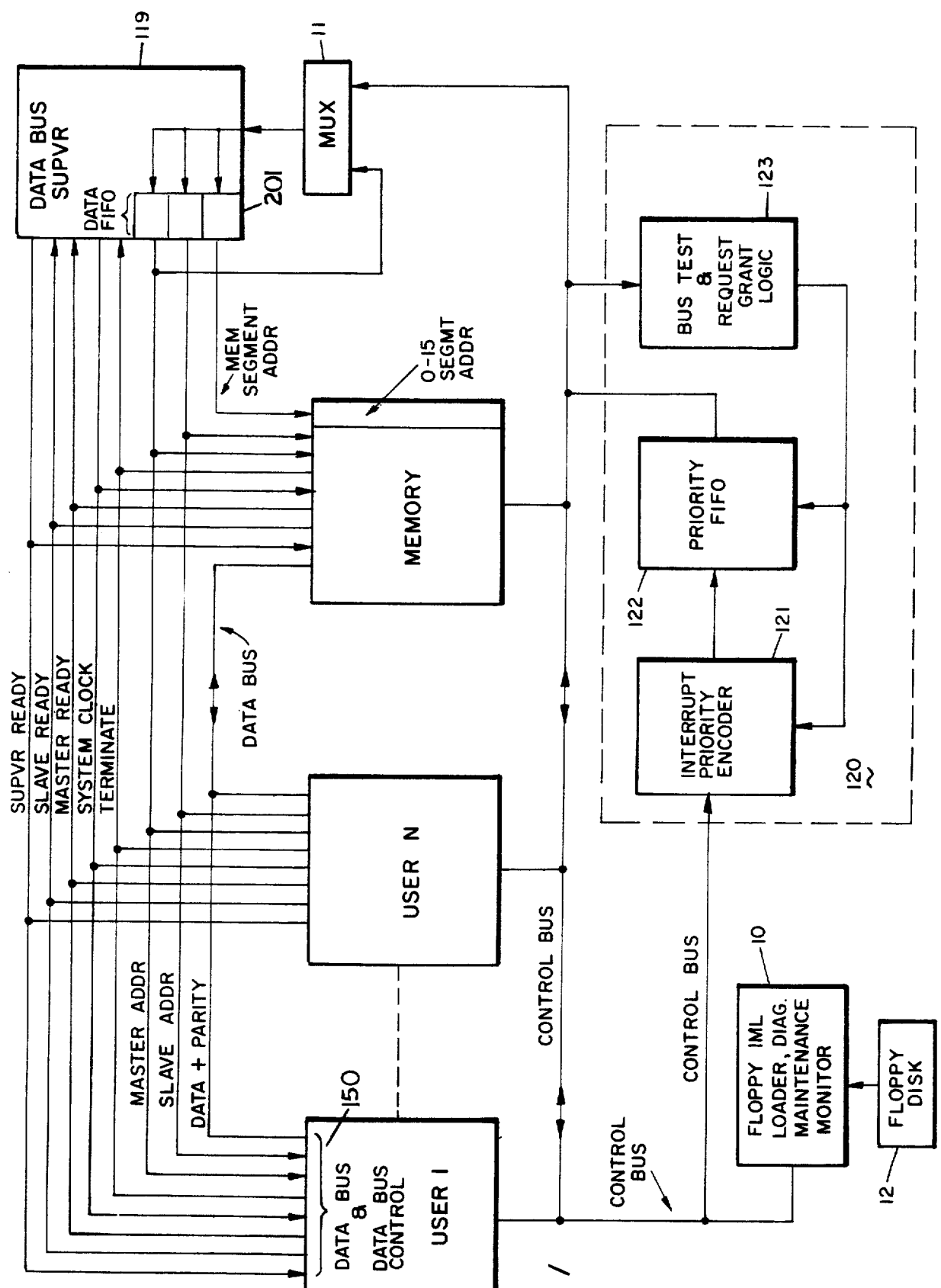
FIG. 1 is a block diagram of the bus architecture system of the invention.

Referring now to FIG. 1, there is shown a schematic block diagram of a data bus architecture which is provided in accordance with the instant invention. In particular, a plurality of user elements, designated User 1 through User N, are provided. The users can be in the nature of disc drive controller, CPU, magnetic tape controller, channel controller, or the like. Also, a memory can be considered to be one of the users, although this will generally be a passive user only. All of the users are connected to a control bus along which various control signals can be provided in a typical fashion. The control bus will, typically, include a plurality of conductors. A maintenance monitor 10 is connected to a floppy disc or tape cassette unit 12 and to the users via the control bus. In addition, the control bus is connected from the various users to the multi-user interrupt priority arbitrator 120. The arbitrator 120 includes a priority interrupt control circuit 121 which is connected to receive signals from the control bus. The priority FIFO 122 is connected to receive signals from the interrupt control circuit 121. The output of the priority FIFO 122 is connected to the control bus. The bus test and request grant logic circuit 123 is connected to monitor the "busy" signal of the control bus, as well as to, selectively, supply signals to the interrupt control circuit 121 and to the priority FIFO 122 in order to control the operation thereof.

The data bus 150 is shown in greater detail. The data bus 150 is connected to each of the users (including the memory) and to the data bus supervisor 119. The data bus supervisor 119 includes a data FIFO 201 which provides signals along the data bus as described hereinafter. A multiplexer 11 is connected to supply signals to the data bus supervisor 119, in particular to the data FIFO 201. The inputs to mux 11 are provided by the outputs of the data FIFO 201 and the control bus, respectively.

In general, the operation of the system as shown and described in FIG. 1 is as follows. When the system operation is begun, the power up takes place and the entire system is reset under the control of a processor in maintenance monitor 10. The maintenance monitor 10 is then directed to load at least a portion of the microprograms stored in the floppy disc device 12. The monitor 10 runs the microprogram and, thereby, identifies the characteristics of each of the users. The monitor then loads the appropriate microprograms from the floppy disc 12 into the appropriate users. Each of the active users scans the remainder of the users (N−1) and determines the identifications (ID's) therefor, and records these ID's in internal registers. In this way, each of the users then has the identities of the line resources which are available for future reference.

Each user may then issue a request to communicate with another user. In order to effect this communication, the user first initiates an interrupt signal which is supplied to the control bus supervisor 120 (one line per user) in order to obtain access to the control bus. The priority interrupt control circuit 121 reviews the interrupt signals and operates thereon. In the event of the concurrent application of two or more interrupts, the control circuit 121 selects and prioritizes the interrupt signals. The priority scheme is, typically, not physical position dependent. It is, typically, controlled and prioritized by a microprogram which is loaded from the maintenance monitor 10 after power up. In the event interrupt signals are not presented concurrently, the signals are merely stored in order of receipt. After prioritization (if any), the requests for use of the control bus are stored or queued in priority FIFO 122.

The bus test and request grant logic circuit 123 then tests the control bus to determine if it is "busy". If, and only if, the bus is not busy, the request grant logic circuit 123 grants access from priority FIFO 122 to the control bus. That is, the address in the first (or top) position on FIFO 122 is "popped" onto the control bus. The address is compared to the internal master and slave addresses of each user. (See description of FIG. 5 for further discussion.) When a comparison is noted, the appropriate user is, effectively activated. Also, the control bus supervisor now resets the priority interrupt encoder 121 and permits another interrupt signal to be detected.

The selected user now performs its desired function. This usually includes loading the master and slave addresses into the "slave" user. In addition, the master and slave addresses are loaded into the bottom of FIFO 201 of data bus supervisor 119 via mux 11. The control bus is now free for other users to gain access thereto. The system is now ready for data transfer under the control of the data bus supervisor 119 through data bus 150.

The data bus supervisor 119 issues the master address, slave address and/or memory segment ID, from the top of FIFO 201 to all users through the master and slave address busses when the data bus is not busy. When the appropriate user address signals (i.e., master and slave) are compared and found to be identical, the Master Ready and Slave Ready signals will be sent to the data bus supervisor 119 from the respective users. The supervisor 119 responds with the Supervisor Ready signal which is supplied to the users. The data transfer will then begin (or resume) at the appropriate rate of transfer. All transferred data (and data to be transferred) are buffered with solid state memory in the respective user. Transfer speed is, typically, limited only by either the data rate of memory or the bus characteristics. That is, the buffer store technique eliminates a dependence upon the operating speed of the specific user.

As will become apparent, there are situations wherein the receiver user will signal a "full" state or the transmitter user will indicate an "empty" state or a short block of data (burst mode) is transmitted. In this case, either the Master Ready or the Slave Ready signal (or both), will be false. The data bus supervisor 119 then circulates the respective user address back to the bottom of FIFO 201 through mux 11. At that time, another pair of user addresses will be issued from the top of FIFO 201 and a similar operation to that described above will continue.

Conversely, if a data transfer operation is concluded, (for example, the end of a file or an abnormal condition occurs) either or both of the respective users will raise the Terminate signal to supervisor 119. In response to the Terminate signal, the supervisor 119 will disconnect the communication between the two users and the addresses will not be recirculated back into the FIFO. That is, the address signal is now discarded. In addition, it will be noted that the slave user reports this status to the master user through the control bus after the data transfer is terminated.

Figure 2:
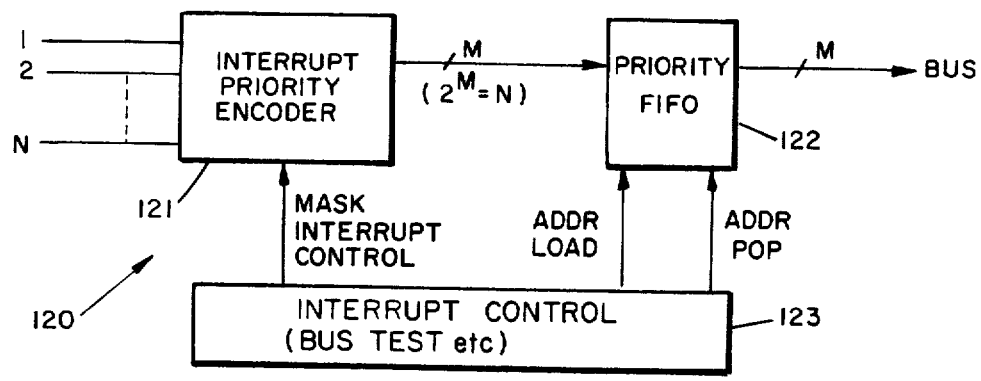
FIG. 2 is a more detailed block diagram of the interrupt/prioritize portion of the system shown in FIG. 1.

Referring now to FIG. 2, there is shown a more detailed block diagram version of the control bus supervisor (or multiuser interrupt priority arbitrator) 120. The interrupt priority encoder 121 is the same in both Figures. Likewise, the the priority FIFO 122 is the same in both cases. Also, the interrupt control 123 and bus test circuit 123 in FIG. 1 are identical.

As shown in FIG. 2, the interrupt encoder 121 consists of suitable, circuitry which adapted to receive N input signals. These output signals represent signals from users 1 through N with one signal line for each user. The output terminal of encoder 121 is connected to the input of priority FIFO 122. As will been seen, the inputs supplied to encoder 121 represent the identification signals for the users. The outputs from encoder 121 represent the addresses of the users coded in binary form in order to save FIFO memory size, e.g., 16 interrupts need 4 bits ($2^4=16$). These address signals are stored in the priority FIFO 122 in the order received from the encoder 121. The output terminal of FIFO 122 is connected to the control bus, as shown in FIG. 1, so that the address signal produced by FIFO 122 is supplied to the bus.

The interrupt control 123 is connected to supply a mask interrupt signal to the interrupt encoder 121 and to supply the address load (ADDR LD) and the address pop (ADDR POP) signals to FIFO 122. In particular, the mask interrupt signal operates to mask the interrupt signal to the interrupt encoder 121. This has the effect of, inter alia, preventing the interrupt encoder 121 from receiving other interrupt signals from the same user prior to accepting the current interrupt.

Likewise, the interrupt control circuit 123 is operative to selectively permit the priority FIFO 122 to be loaded from the encoder 121. At the appropriate time, the address previously stored in the FIFO is "popped" out onto the bus under control of the interrupt control 123 when the control bus is not busy.

Figure 3A:
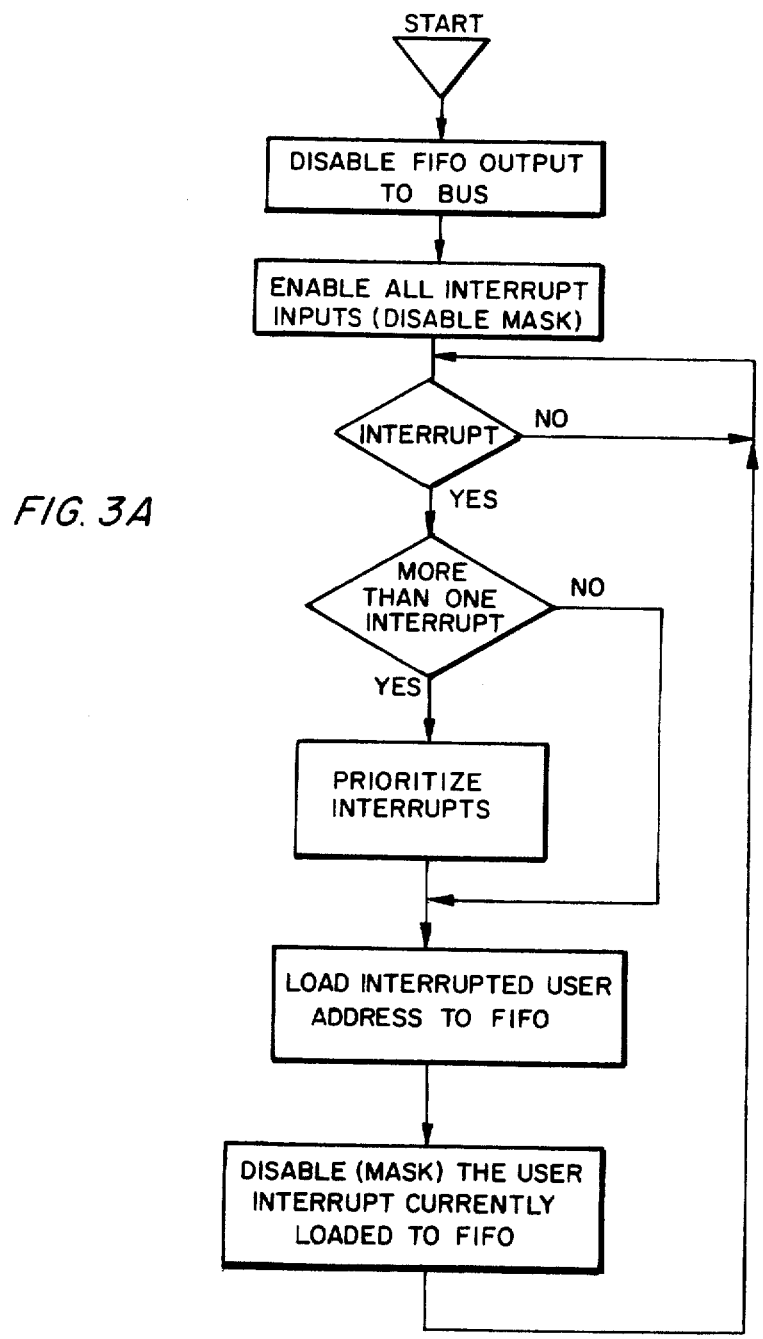

Concurrent reference is made to FIGS. 3A and 3B for an understanding of the operation of the circuit.

Referring specifically to FIG. 3A, the operation of the circuit is begun at the START time. With the application of the start up signal, the system is reset. Including the content of FIFO, the output of FIFO 122 is disabled so that no signals are supplied therefrom to the control bus. This avoids an inadvertent transfer of an inappropriate signal. All user priorities are set up by microprogram which is loaded previously from the maintenance monitor 10. These priorities are not physical location dependent.

Thereafter, the interrupt control 123 enables all of the interrupt inputs of encoder 121. The interrupt control 123 then samples all of the interrupt signals 1 through N to determine whether or not an interrupt signal has been generated by one or more users. In the event that no interrupt signal is detected, the control circuit continues to scan the interrupt inputs.

When the interrupt control circuit 123 detects the presence of an interrupt signal at the input to encoder 121, the interrupt signals are accepted by the encoder 121. The encoder 121 is arranged, in accordance with known techniques, to determine which of the interrupts has priority in the event that a plurality of interrupts are presented concurrently. As noted above, if the interrupts are received sequentially, the encoder merely receives the same and produces an output representative thereof.

When the encoder has prioritized the interrupt signals, the control circuit permits the corresponding binary coded address to be loaded from encoder 121 into FIFO 122. This coded address is, as noted, the address of the particular user which has made the interrupt request. The address is loaded into FIFO 122 in response to the address load signal which is supplied from control 123 to FIFO 122. At the same time, the control circuit 123 produces a mask (or disable) signal which prevents the user which is currently providing an interrupt signal from providing another one immediately and, thereby, "hogging" the circuit. Thus, a second user can supply an interrupt signal and gain access to the system. The interrupt inputs are further sampled by the interrupt control circuit 123 to see if other interrupt signals have been supplied whereupon the operation continues as noted.

Referring specifically to FIG. 3B, the operation relative to the FIFO 122 is described. With the start up operation, the FIFO 122 output was cleared and disabled by the interrupt control circuit. At the same time, the FIFO 122 is interrogated. If the FIFO 122 is empty, i.e., no user interrupt request is stored therein, the FIFO continues to be investigated or interrogated. When the FIFO is no longer empty, the bus test and request grant logic 123 tests the control bus to see if it is busy. If the bus is busy, the bus testing continues until the bus is clear. At that time, access to the control bus can be obtained. When access to the bus is obtained, the top of the FIFO is enabled and the contents thereof is supplied to the bus. (Thus, the user address is "popped" to the bus and the requesting user controls the bus as described above.) At the same time, the activated user operates to reset the user interrupt request which was present at the input to encoder 121. This then permits the system to enable the interrupt input (i.e., disable the mask) of the currently granted address so that the user can make a further interrupt request, if so desired. When this operation is completed, the FIFO is again interrogated and the operation shown in FIG. 3B continues.

Thus, there is shown and described an interrupt priority arbitrator which is useful with a multiplicity of users. The interrupt arbitrator serves to sort out and prioritize interrupt signals which are received concurrently. Otherwise, the encoder merely queues the interrupt signals as they are received. The signals are supplied to a FIFO which permits first in, first out operation under the control of an interrupt control and bus testing circuit. The interrupt control prevents one interrupt signal or user from hogging the system. The circuit uses a digital technique to allocate bus access to multiple users which are sharing a common control bus for interuser communication. This apparatus and method insures that all user requests are honored, that no user is effectively locked out and that requests are processed on both the priority and a first-come, first-served basis.

Moreover, once the interrupt signal is received and recorded by the encoder, the appropriate addresses are queued in the FIFO so that the next opportunity to access the control bus is provided to the user. Thus, the user can supply the interrupt request signal and proceed with other activities while the arbitrator circuit shown and described in FIGS. 1 and 2 automatically keeps track of the request (in the event of a bus busy signal) and grants access to the control bus at the next available time. The user is not required to continue accessing the bus or to stand idle while awaiting access to the bus.

Referring now to FIG. 4, there is shown a more detailed block diagram of the data bus supervisor 119. Again, components which are similar to those described previously bear similar reference numerals. The control bus is connected to supply one set of input signals to mux 11. The other set of input signals to mux 11 is provided by outputs from the first (top) stage of FIFO 201. The data bus control circuit 202 is connected to the data bus control signal lines which are connected to all users 1 through N. The contents of FIFO 201 is initially loaded from a requesting user through the control bus. The contents of FIFO 201 comprises the master and slave address and/or the memory segment identification (when the memory is a user). When the data bus is not busy, the user ID's, namely, a master and slave address signal, will be issued from the top of the FIFO 201 to all of the users which are connected to the master address and slave address lines of the data bus, as shown.

All of the users 1 through N will compare the user ID signals with the ID signals stored in the respective registers. When a correspondence is detected by the particular user, the master ready and slave ready signals will be produced by the respective user in the appropriate user pair. When the master ready and slave ready signals are received by the bus control circuit 202, the supervisor ready signal is generated at the next clock time; the data transfer takes place thereafter.

In the event that the data empty signal is produced by the transmitter side or a data full signal is produced by the receiver side of the user pair, which is not the end of file or abnormal data transfer, the user ID will circulate back into the bottom of the FIFO through mux 11 for further use. This will maintain the user in contact with the remainder of the system and permit relatively slow operating users to be able to complete their operations without the necessity of queuing up repeatedly in order to transfer data information as well as to eliminate the bus set-up overhead requirements.

On the other hand, at the end of a data transfer operation or in the event of an abnormal status (error condition), current user ID's will be discarded and will not be recirculated back into the FIFO. Typically, this is controlled by the application of the terminate signal to the bus control circuit 202 by the user or users involved.

Referring now to FIG. 5, there is shown a more detailed block diagram of the circuit for providing the Ready signals. As noted above, each of the users includes a master address register, and a slave address register as well as a compare circuit. The pair of registers in two users is shown schematically. One of the users is referred to as the master user while the other is referred to as the slave user. The address register in the master user is connected to the compare circuit M along with the master address (or ID) which is supplied by the data bus supervisor 119 noted above. Likewise, the slave address register in the slave user is connected to the compare circuit S along with the slave address line of data bus supervisor 119. The output terminals of compare circuits M and S are connected to input terminals of AND gate 50 which also receives the data buffer ready signal from circuitry within the user.

When all of the signals are of the proper logic level (depending upon circuit design criterion previously chosen), AND gate 50 produces a representative signal which is supplied to the D input terminal of D-type flip-flop 51. With the application of the system clock signal at the clock terminal (C) of flip-flop 51, the Q output terminal of the flip-flop is turned "on" thereby to reflect the status at the D input terminal. Thus, the master or slave ready signals are provided to the data bus supervisor. In response to receipt of the master ready and slave ready signals, the data bus supervisor produces the supervisor ready signal. At this point, the system is ready to operate and data is transferred over data bus 150 from the master user to the slave user.

Thus, there is shown a high speed bus architecture for control and transfer of data between a plurality of user devices. The architecture is able to sort out priorities of commands or requests. Also, the architecture is able to control which user pair (sender/receiver or master/slave) is to be in control of the data transfer bus. The description herein shows and describes certain specific devices, circuits or the like. However, any other suitable devices or circuits are to be included within the description where appropriate. The described embodiment is illustrative only and is not limitative. The scope of this invention is limited only by the claims appended hereto.

Having thus described a preferred embodiment, what is claimed is:

1. A bus architecture system for selectively connecting a plurality of user devices to each other, comprising,
   priority interrupt encoder means (121) for receiving and prioritizing interrupt signals from one or more of said user devices when one or more of said user devices attempt to access another user device,
   control bus means interconnecting each of said user devices, and
   test means (123) connected to said control bus means and said encoder means for determining when said encoder means can gain access to said control bus means as a function of the status of said control bus means so that one user device can gain access to another user device.

2. The system recited in claim 1 including,
   data bus means interconnecting each of said user devices, and
   control means connected to said control bus means to selectively enable said data bus means to activate a pair of said user devices for data transfer therebetween as determined by said encoder means.

3. The system recited in claim 1 wherein,
   said test means is connected to said control bus status to test whether said control bus is busy and to selectively permit access thereto only when not busy.

4. The system recited in claim 1 wherein,
   said encoder means comprises means for receiving interrupt requests from said user devices, and
   register means for storing interrupt requests as received and prioritized by said encoder means.

5. The system recited in claim 2 wherein,
   said control means includes register means connected to each of said user devices to selectively supply address signals to said pair of said user devices.

6. The system recited in claim 2 including,
   multiplexer means connected to supply signals to the input of said control means and to receive output signals from said control means and from said control bus.

7. The system recited in claim 1 wherein,
   each of said user devices includes register means for storing therein a master address for itself and a slave address for another user device which may communicate therewith.

8. The system recited in claim 1 including,
   input means for selectively storing information within said user devices via said control bus.

9. The system recited in claim 4 wherein,
   said register means is a FIFO type register which is connected to supply signals to said control bus.

10. The system recited in claim 2 wherein,
    said control means suplies signals to said user devices via said data bus means, and
    said user devices selectively supply signals to said control means via said data bus means whereby said control means and said user devices determine which of said user devices are to be activated.

11. A bus architecture system comprising,
    a plurality of user devices,
    a control bus connected to each of said user devices to permit addressing communication between said user devices,
    a data bus connected to each of said user devices for selectively transferring information between said user devices,
    interrupt encoder means connected to receive interrupt signals from said control bus wherein said interrupt signals signify that one user device is attempting to access another user device via said control bus,
    storage means for storing said interrupt signals until said control bus is not busy, and
    test means connected to said control bus and to said encoder means to selectively operably connect said encoder means to said control bus only when said control bus is not busy.

12. The system recited in claim 11 including,
    supervisory means connected to said data bus to control the operation thereof and to said control bus to receive control signals therefrom.

13. The system recited in claim 11 wherein,
    each of said user devices has a separate identification designation (ID).

14. The system recited in claim 13 wherein,
    each of said user devices includes internal storage means for storing the ID of at least one other user device.

15. A bus architecture system for permitting intercommunication between a plurality of separate user devices, comprising,
    control bus means connected to each of said user devices to permit any user device to access any other user device by means of interrupt (address) signals,
    encoder means connected to said control bus means to receive said interrupt (address) signals and store same in the order received,
    test means connected to said encoder means and to said control bus means such that said encoder means can be enabled to place a stored interrupt (address) signal on said control bus only when said control bus is not busy, as determined by said test means, and
    data transfer means connected to each of said user devices to transfer data information signals between at least two user devices in response to an interrupt (address) signal which is received from said control bus.

16. The system recited in claim 15 wherein, said encoder means is operable to prioritize the interrupt (address) signals supplied thereto in the event of the concurrent application of two or more such interrupt (address) signals.

17. The system recited in claim 15 wherein
said test means includes logic circuit means to supply a signal to said encoder means to permit the interrupt (address) signals stored therein to be placed on said control bus.

18. The system recited in claim 17 wherein,
said encoder means includes a FIFO register for storing said interrupt (address) signals in the prioritized order.

19. The method of interconnecting a plurality of user devices comprising the steps of,
storing the addresses of all user devices in each of the user devices so that access can be made thereby,
storing an interrupt address signal from any user device in the priority order in which the interrupt address signal are received,
testing to see if a control bus means is able to receive and operate on an interrupt address signal, and
supplying the interrupt address signal to the control bus means when said bus means is not busy whereby the appropriate user devices (as determined by the interrupt address signal) can communicate through a data bus.

* * * * *